US012341699B2

(12) United States Patent
Kuravangi-Thammaiah et al.

(10) Patent No.: US 12,341,699 B2
(45) Date of Patent: Jun. 24, 2025

(54) SYSTEMS AND METHODS FOR MONITORING NETWORK DEVICES BASED ON PREDICTIVE ANALYSIS

(71) Applicant: Verizon Patent and Licensing Inc., Basking Ridge, NJ (US)

(72) Inventors: Shanthala Kuravangi-Thammaiah, Keller, TX (US); Jodi A. Kelm, Miltona, MN (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 292 days.

(21) Appl. No.: 17/931,248

(22) Filed: Sep. 12, 2022

(65) Prior Publication Data

US 2024/0089205 A1 Mar. 14, 2024

(51) Int. Cl.
*H04L 47/125* (2022.01)
*H04L 43/16* (2022.01)
*H04L 47/74* (2022.01)

(52) U.S. Cl.
CPC .......... *H04L 47/125* (2013.01); *H04L 43/16* (2013.01); *H04L 47/746* (2013.01)

(58) Field of Classification Search
None
See application file for complete search history.

(56) References Cited

U.S. PATENT DOCUMENTS

| | | | | |
|---|---|---|---|---|
| 6,167,320 A | * | 12/2000 | Powell | G06Q 10/06 700/95 |
| 6,601,014 B1 | * | 7/2003 | Dempsey | H04M 15/00 702/182 |
| 10,409,649 B1 | * | 9/2019 | Young | G06F 9/5083 |
| 10,764,336 B1 | * | 9/2020 | Raghunathan | H04L 65/1069 |
| 11,252,200 B2 | * | 2/2022 | Sinha | H04L 65/1073 |
| 11,418,586 B2 | * | 8/2022 | Subramaniam | H04L 43/0805 |
| 11,729,656 B2 | * | 8/2023 | Sabeur | H04L 65/1016 370/235 |
| 2002/0083174 A1 | * | 6/2002 | Hayashi | H04L 47/746 709/225 |

(Continued)

FOREIGN PATENT DOCUMENTS

| | | | | |
|---|---|---|---|---|
| EP | 2561655 B1 | * | 1/2014 | ......... H04L 65/1006 |
| EP | 2722767 A1 | * | 4/2014 | ........... G06F 13/362 |

(Continued)

*Primary Examiner* — Sandarva Khanal

(57) ABSTRACT

A device may receive network data for network devices of an IMS network, and may determine that the network devices are active. The device may identify a set of network devices associated with the network data satisfying an upper threshold, and may determine that the network data of the set of network devices indicates healthy redundant network devices and satisfies a lower redundancy threshold. The device may determine that network data of the healthy redundant network devices satisfies an upper redundancy threshold, and may calculate a variance for the network data of the set of network devices. The device may analyze the network data of the set of network devices based on the variance satisfying a variance threshold, and may identify a first increase or a second increase in traffic for a particular network device. The device may perform actions based on identifying the first increase or the second increase.

20 Claims, 11 Drawing Sheets

(56) References Cited

U.S. PATENT DOCUMENTS

| | | | | |
|---|---|---|---|---|
| 2011/0202645 | A1* | 8/2011 | Abdelal | H04L 43/12 |
| | | | | 709/223 |
| 2012/0198085 | A1* | 8/2012 | Xu | H04L 61/4511 |
| | | | | 709/228 |
| 2012/0327954 | A1* | 12/2012 | Iourtchenko | H04L 65/70 |
| | | | | 370/474 |
| 2014/0146812 | A1* | 5/2014 | Qiu | H04L 65/1073 |
| | | | | 370/352 |
| 2015/0249989 | A1* | 9/2015 | Aksu | H04W 28/0231 |
| | | | | 455/453 |
| 2020/0120146 | A1* | 4/2020 | Christopher | H04L 65/1016 |
| 2021/0266349 | A1* | 8/2021 | Foti | H04W 68/005 |
| 2023/0291490 | A1* | 9/2023 | Korovin | H03L 7/22 |

FOREIGN PATENT DOCUMENTS

| | | | | |
|---|---|---|---|---|
| EP | 3217631 A1 * | 9/2017 | | H04L 45/245 |
| EP | 3050279 B1 * | 6/2021 | | H04L 41/06 |
| EP | 4037292 A1 * | 8/2022 | | H04L 65/1016 |
| WO | WO-2017060756 A1 * | 4/2017 | | H04L 5/001 |

* cited by examiner

SYSTEMS AND METHODS FOR MONITORING NETWORK DEVICES BASED ON PREDICTIVE ANALYSIS

BACKGROUND

An Internet protocol (IP) multimedia core network subsystem (IMS) is a standardized architectural framework for delivering IP multimedia services in a network.

DETAILED DESCRIPTION OF EXAMPLE EMBODIMENTS

Figure 1A:
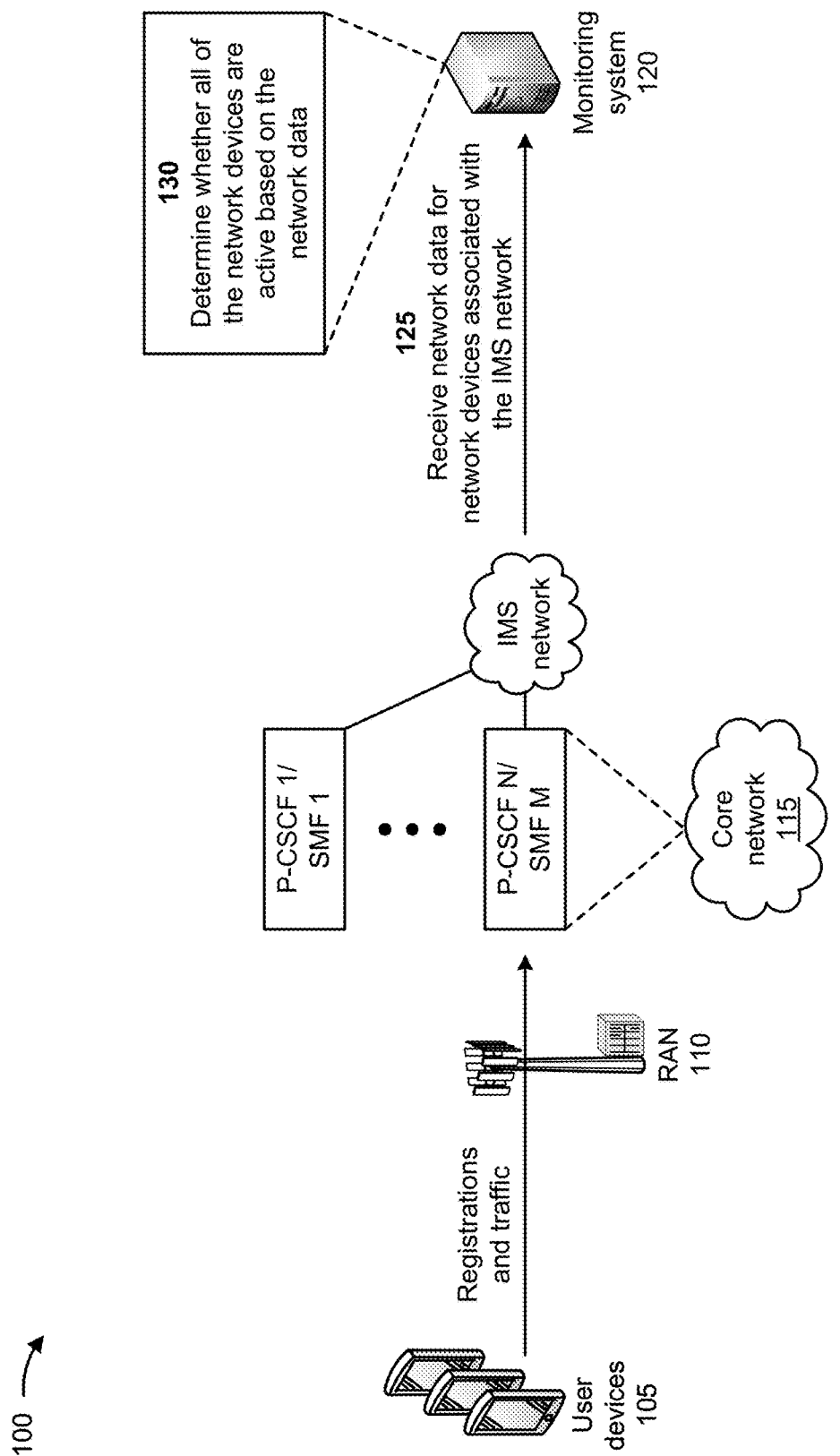
FIGS. 1A-1G are diagrams of an example associated with monitoring network devices associated with an IMS network based on predictive analysis.

The following detailed description of example implementations refers to the accompanying drawings. The same reference numbers in different drawings may identify the same or similar elements.

In an IMS network, not all traffic on network devices, such as a proxy-call session control function (P-CSCF) in a fourth-generation (4G) network and a session management function (SMF) in a fifth-generation (5G) network, is handled the same way. This may result in traffic being unbalanced in the P-CSCF and/or the SMF. Global traffic management (GTM) may be utilized to rebalance new traffic in the P-CSCF and/or the SMF, but may be insufficient since GTM can cater only to new initial registrations due to device power cycles, lost radio frequency (RF) signaling, gateway changes, and/or the like. Furthermore, there are several new devices, such as machine-to-machine (M2M) devices, multiple endpoint devices, and/or the like, that are always online, stationary, and utilize IMS services.

The IMS network may maintain a registration stickiness for each device that lasts until a device provides a new initial registration. The registration stickiness may persist for more than two weeks unless a device power cycles or loses connectivity to the IMS network. Registration stickiness may enable network devices to optimize network routing, optimize call processing, and reduce computational requirements during re-registration. However, registration stickiness may also cause uneven traffic to accumulate on the P-CSCF and/or the SMF. Traffic distribution at the P-CSCF and/or the SMF also depends on what gateways or natural occurrences triggered events in the IMS network. Anytime a traffic load of the P-CSCF and/or the SMF exceeds a particular value (e.g., a forty percent utilization), other network devices (e.g., application servers or neighboring network devices) may become overloaded and fail. As a result, traffic at the P-CSCF and/or the SMF needs to be manually rebalanced, which requires time and effort from a network operations team.

Network monitoring is typically performed in a reactive mode, which means that traffic at the P-CSCF and/or the SMF will be manually rebalanced only after an increase is observed in key performance indicators (KPI), network errors, and/or the like. Manually rebalancing the traffic at the P-CSCF and/or the SMF may require five to six hours, since the network operations team needs to understand all causes of the unbalance, which may have occurred in the network for more than a week. Manually rebalancing the traffic at the P-CSCF and/or the SMF may result in significant network disruption.

Thus, current mechanisms for handling unbalanced traffic at the P-CSCF and/or the SMF consume computing resources (e.g., processing resources, memory resources, communication resources, and/or the like), networking resources, and/or other resources associated with reactively monitoring a network, rebalancing traffic at the P-CSCF and/or the SMF after observing network issues, causing a network disruption and lost traffic, attempting to recover the lost traffic caused by the network disruption, and/or the like.

Some implementations described herein provide a monitoring system that monitors network devices associated with an IMS network based on predictive analysis. For example, the monitoring system may receive network data for network devices associated with an IMS network, and may determine whether all of the network devices are active based on the network data. The monitoring system may identify a set of network devices associated with the network data satisfying an upper utilization threshold, and may determine whether the network data associated with the set of network devices indicates healthy redundant network devices for the set of network devices and satisfies a lower redundancy threshold. The monitoring system may determine that network data associated with the healthy redundant network devices satisfies an upper redundancy threshold, and may calculate a variance for the network data associated with the set of network devices. The monitoring system may determine that the variance satisfies a variance threshold, and may analyze the network data associated with the set of network devices, for a time period, based on the variance satisfying the variance threshold. The monitoring system may identify a first increase in traffic for a particular network device, of the set of network devices, or a second increase in the traffic for the particular network device based on analyzing the network data associated with the set of network devices, and may perform one or more actions based on identifying the first increase or the second increase in the traffic for the particular network device.

In this way, the monitoring system monitors network devices associated with an IMS network based on predictive analysis. For example, the monitoring system may proactively monitor an IMS network and network devices (e.g., the P-CSCF and/or the SMF) associated with the IMS network, and may proactively rebalance traffic at the P-CSCF and/or the SMF based on predictive analysis, network KPIs, and system data. The monitoring system may perform an analysis of historical data associated with the IMS network, and may utilize existing behavior patterns of the IMS network to predict future events in the IMS network (e.g., which may cause unbalanced traffic at the P-CSCF and/or the SMF and network disruption). Thus, the monitoring system may conserve computing resources, networking resources, and/or other resources that would otherwise have been consumed by reactively monitoring a network, rebalancing traffic at the P-CSCF and/or the SMF after observing network issues, causing a network disruption and lost traffic, attempting to recover the lost traffic caused by the network disruption, and/or the like. Although implementations are described in connection with the P-CSCF and/or the SMF, the implementations may be utilized with other IMS functions, such as an interrogating CSCF (I-CSCF), a serving CSCF (S-CSCF), a telephony application server (TAS), a home subscriber server (HSS) 230, an authentication, authorization, and accounting server (AAA), and/or the like.

FIGS. 1A-1G are diagrams of an example 100 associated with monitoring network devices associated with an IMS network based on predictive analysis. As shown in FIG. 1A, the example 100 may include user devices 105, a radio access network (RAN) 110, a core network 115, and an IMS network. The core network 115 may include proxy-call session control functions (P-CSCFs) (e.g., P-CSCF 1 through P-CSCF N) when the core network 115 is a fifth-generation (5G) core network, and may include session management functions (SMFs) (e.g., SMF 1 through SMF M) when the core network 115 is a fourth-generation (4G) core network. Further details of the user devices 105, the RAN 110, the core network 115, the IMS network, the monitoring system 120, the P-CSCFs, and the SMFs are provided elsewhere herein. In some implementations, one or more of the functions described herein as being performed by the monitoring system 120 may be performed by one or more of the P-CSCFs or one or more of the SMFs.

As shown in FIG. 1A, the user devices 105 may register with the core network 115 and the IMS network via the RAN 110, and may provide traffic to the core network 115 and the IMS network via the RAN 110 and the P-CSCFs or the SMFs. For example, the user devices 105 may provide the traffic to the IMS network via the RAN 110 and the P-CSCFs when the core network 115 is a 4G core network. The user devices 105 may provide the traffic to the IMS network via the RAN and the SMFs when the core network 115 is a 5G core network. In some implementations, unbalanced traffic may be provided to one or more of the P-CSCFs or one or more of the SMFs, which may require the one or more P-CSCFs or the one or more SMFs to be rebalanced.

As further shown in FIG. 1A, and by reference number 125, the monitoring system 120 may receive network data for network devices associated with the IMS network. For example, network devices associated with the IMS network (e.g., the P-CSCFs or the SMFs, other network devices associated with the core network 115, and/or the like) may generate the network data, and may provide the network data to the monitoring system 120. The monitoring system 120 may receive the network data from the network devices associated with the IMS network. In some implementations, the network data may include data identifying processor utilizations by the P-CSCFs or the SMFs, memory utilizations by the P-CSCFs or the SMFs, registered subscribers associated with the P-CSCFs or the SMFs, health statuses associated with the P-CSCFs or the SMFs (e.g., as provided by a GTM system), GTM table data associated with the P-CSCFs or the SMFs, and/or the like. The network data may include key performance indicators (KPIs) associated with the P-CSCFs or the SMFs, such as KPIs indicating processor utilizations by the P-CSCFs or the SMFs, memory utilizations by the P-CSCFs or the SMFs, registered subscribers associated with the P-CSCFs or the SMFs, health statuses associated with the P-CSCFs or the SMFs, and/or the like.

As further shown in FIG. 1A, and by reference number 130, the monitoring system 120 may determine whether all of the network devices (e.g., the P-CSCFs or the SMFs) are active based on the network data. For example, the GTM table data may include a list indicating whether the network devices are active or inactive. The list of the GTM table data may indicate that a network device is inactive when the GTM system is unable to discover the network device, which may occur during planned activities (e.g., maintenance activities) in the network. If the list of the GTM table data indicates that at least one network device is inactive, the monitoring system 120 may determine that not all of the network devices are active based on the network data. If the list of the GTM table data fails to indicate that at least one network device is inactive, the monitoring system 120 may determine that all of the network devices are active based on the network data.

Figure 1B:
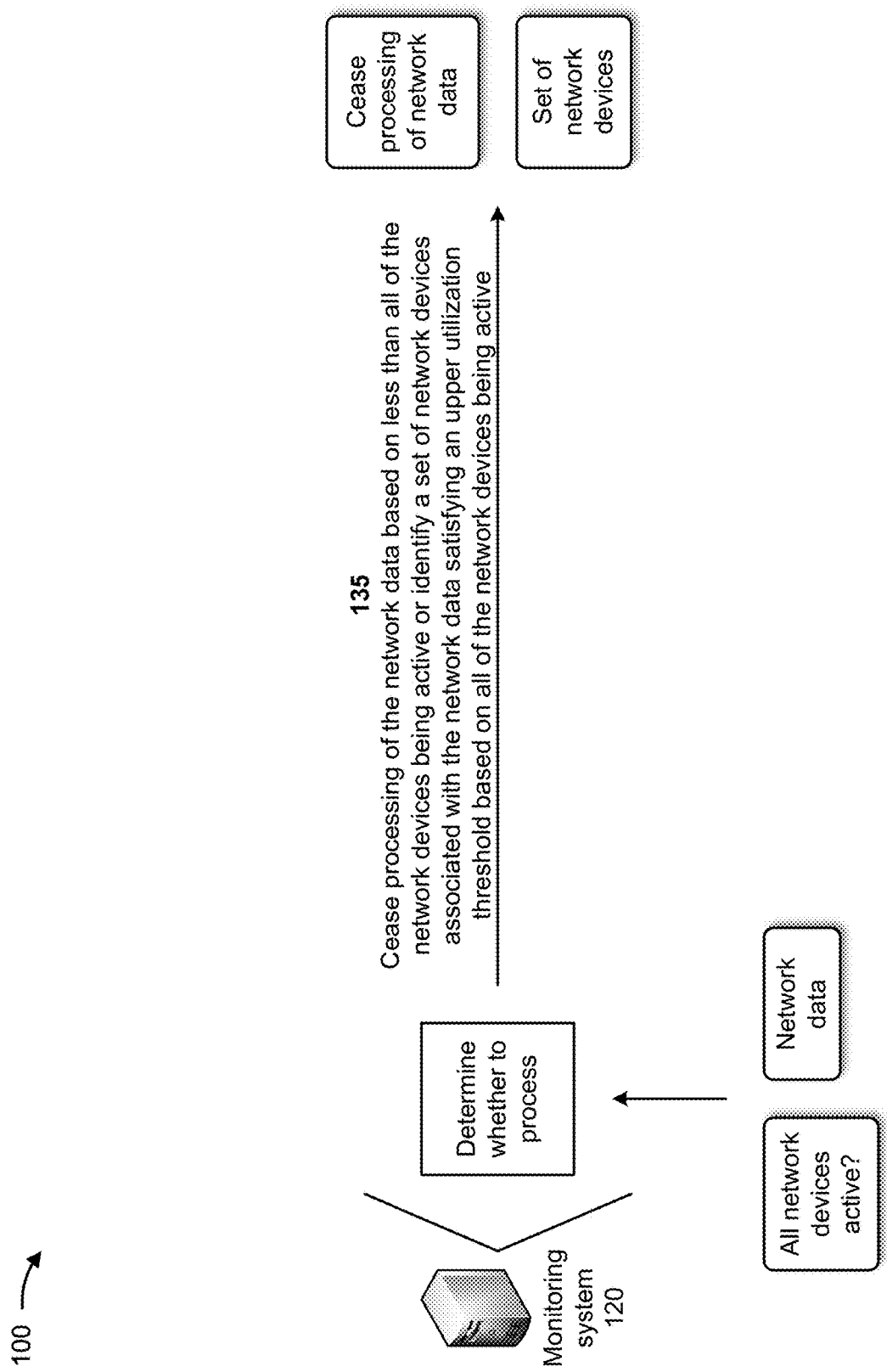

As shown in FIG. 1B, and by reference number 135, the monitoring system 120 may cease processing of the network data when less than all of the network devices are active or may identify a set of network devices associated with the network data satisfying an upper utilization threshold when all of the network devices are active. For example, if the monitoring system 120 determines that at least one network device is inactive (e.g., less than all of the network devices are active), the monitoring system 120 may cease processing the network data. The monitoring system 120 may cease processing the network data since less than all of the network devices being active may indicate the occurrence of a network activity (e.g., a maintenance activity) during which monitoring for unbalanced traffic in the network devices may be futile. In this way, the monitoring system 120 may conserve resources associated with unnecessary monitoring. If the monitoring system 120 determines that all of the network devices are active, the monitoring system 120 may identify the set of network devices associated with the network data satisfying an upper utilization threshold. For example, the monitoring system 120 may determine the upper utilization threshold for the network data (e.g., an upper processor utilization threshold, an upper memory utilization threshold, and/or the like), and may identify, from the network devices, the set of network devices associated with the network data that satisfies the upper utilization threshold.

Figure 1C:
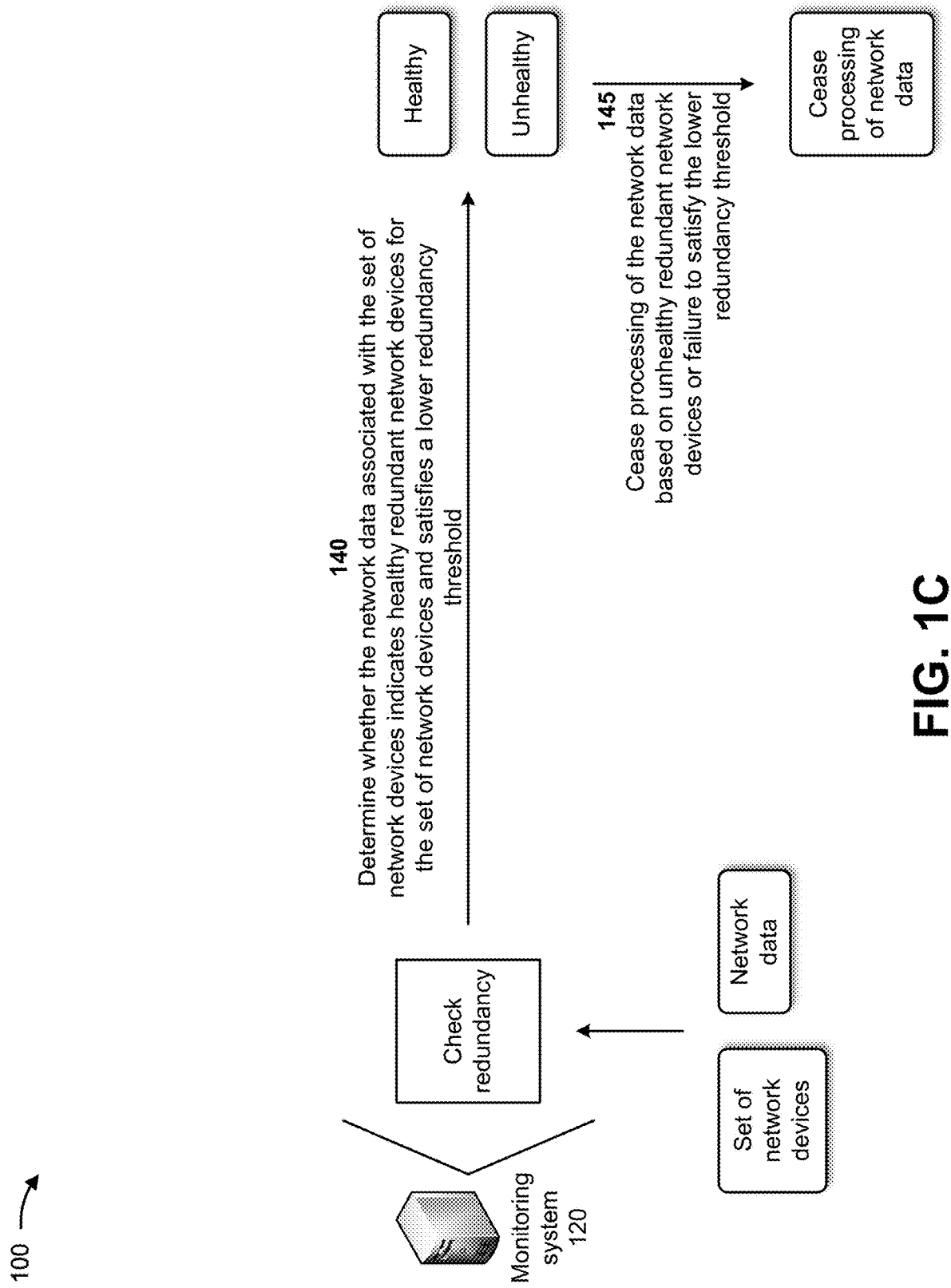

As shown in FIG. 1C, and by reference number 140, the monitoring system 120 may determine whether the network data associated with the set of network devices indicates healthy redundant network devices for the set of network devices and satisfies a lower redundancy threshold (e.g., a quantity of healthy redundant network devices). For example, the monitoring system 120 may identify redundant network devices within the set of network devices (e.g., as network devices that perform redundant operations for the set of network devices), and may determine whether the redundant network devices are healthy based on the network data associated with the set of network devices. In some implementations, the monitoring system 120 may utilize health indications provided by the GTM table data (e.g., of the network data) to determine whether the redundant network devices are healthy. A network device may be healthy when the network device satisfies a throughput threshold, a latency threshold, a processor utilization threshold, a memory utilization threshold, and/or the like. A network device may be unhealthy when the network fails to satisfy one or more of the throughput threshold, the latency threshold, the processor utilization threshold, the memory utilization threshold, and/or the like. The monitoring system 120 may also determine the lower redundancy threshold for the network data associated with the set of network devices (e.g., a minimum processor utilization threshold, a minimum memory utilization threshold, and/or the like for the redundant network devices). The monitoring system 120 may determine whether the network data associated with the set of network devices satisfies the lower redundancy threshold, which may further provide an indication of the health of the redundant network devices. In some implementations, the monitoring system 120 may determine that the network data indicates that the redundant network devices are healthy or that the redundant network devices are unhealthy. In some implementations, the monitoring system 120 may determine that the network data satisfies the lower redundancy threshold or fails to satisfy the lower redundancy threshold.

As further shown in FIG. 1C, and by reference number 145, the monitoring system 120 may cease processing of the network data based on unhealthy redundant network devices or failure to satisfy the lower redundancy threshold. For example, if the monitoring system 120 determines that the network data associated with the set of network devices indicates that one or more of the redundant network devices are unhealthy, the monitoring system 120 may cease processing the network data. If the monitoring system 120 determines that the network data associated with the set of network devices fails to satisfy the lower redundancy threshold (e.g., the quantity of healthy redundant network devices is low), the monitoring system 120 may also cease processing the network data. The monitoring system 120 may cease processing the network data in these situations since monitoring for unbalanced traffic in the network devices may be futile when the redundant network devices, within the set of network devices, are unhealthy. In this way, the monitoring system 120 may conserve resources associated with unnecessary monitoring.

Figure 1D:
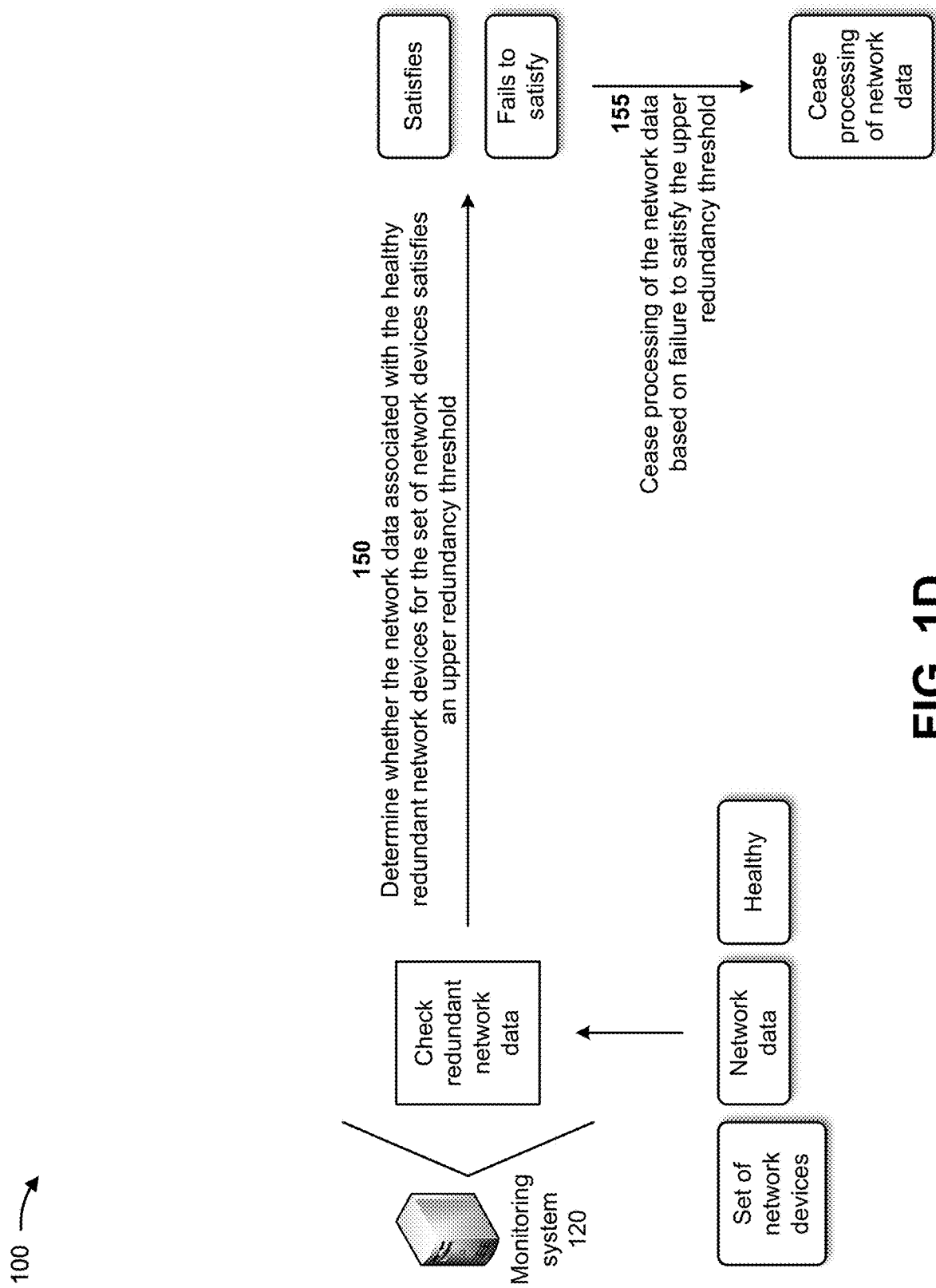

As shown in FIG. 1D, and by reference number 150, the monitoring system 120 may determine whether the network data associated with the healthy redundant network devices for the set of network devices satisfies an upper redundancy threshold (e.g., a quantity of healthy redundant network devices). For example, if the monitoring system 120 determines that the network data associated with the set of network devices indicates that the redundant network devices are healthy and satisfies the lower redundancy threshold, the monitoring system 120 may determine whether the network data associated with the healthy redundant network devices satisfies the upper redundancy threshold. In some implementations, the monitoring system 120 may determine that the network data associated with the healthy redundant network devices satisfies the upper redundancy threshold. Alternatively, the monitoring system 120 may determine that the network data associated with the healthy redundant network devices fails to satisfy the upper redundancy threshold.

As further shown in FIG. 1D, and by reference number 155, the monitoring system 120 may cease processing of the network data based on failure to satisfy the upper redundancy threshold (e.g., fails to satisfy the quantity of healthy redundant network devices). For example, if the monitoring system 120 determines that the network data associated with the healthy redundant network devices for the set of network devices fails to satisfy the upper redundancy threshold, the monitoring system 120 may cease processing the network data and may identify failures associated with neighboring network devices of the set of network devices. The monitoring system 120 may cease processing the network data since monitoring for unbalanced traffic in the network devices may be futile when failures are occurring in the neighboring network devices of the set of network devices. In this way, the monitoring system 120 may conserve resources associated with unnecessary monitoring.

Figure 1E:
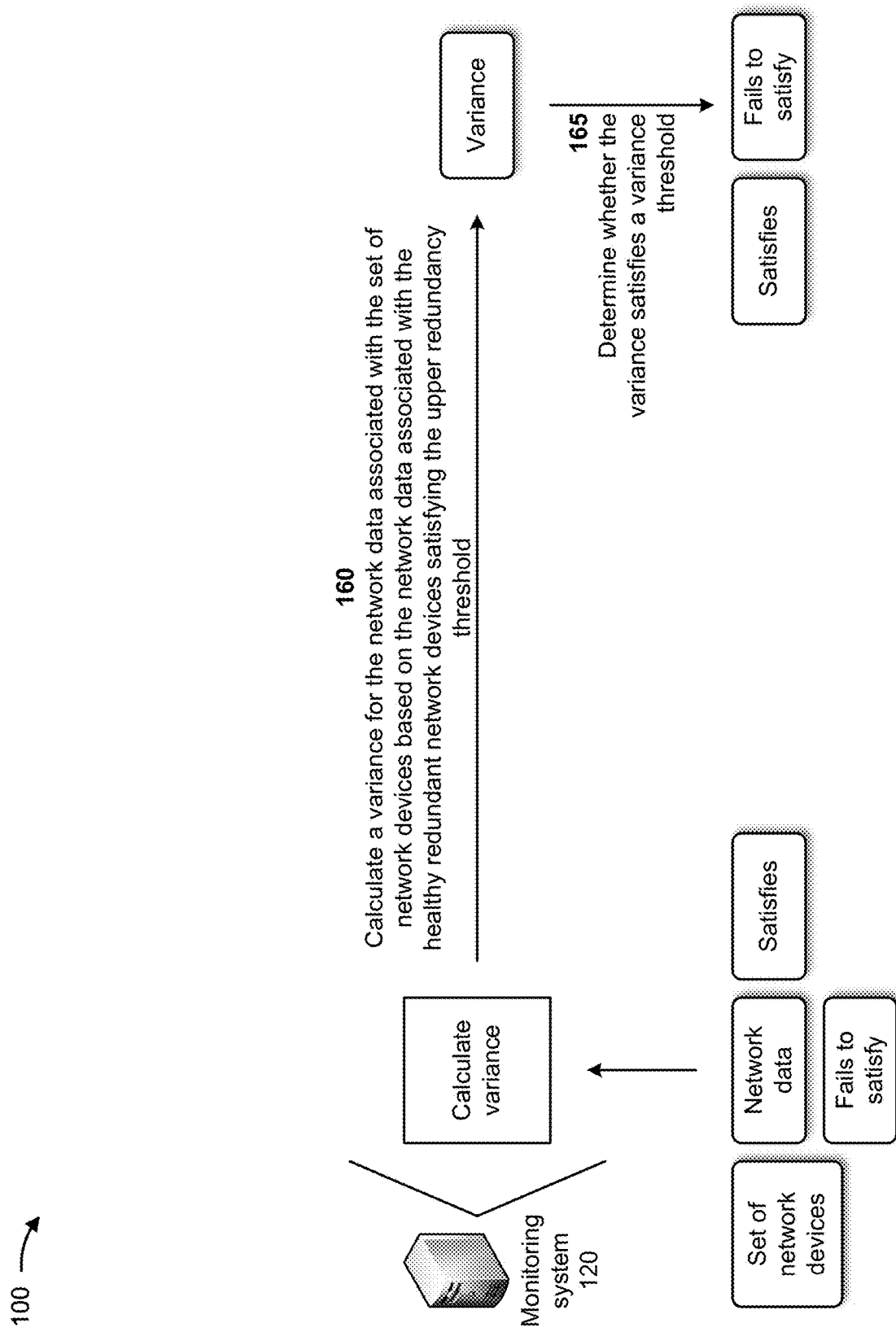

As shown in FIG. 1E, and by reference number 160, the monitoring system 120 may calculate a variance for the network data associated with the set of network devices based on the network data associated with the healthy redundant network devices satisfying the upper redundancy threshold. The variance may provide a measure of dispersion for the network data (e.g., a measure of how far a set of numbers is spread out from an average value). For example, if the monitoring system 120 determines that the network data associated with the healthy redundant network devices satisfies the upper redundancy threshold, the monitoring system 120 may calculate the variance for the network data associated with the set of network devices. In some implementations, the variance may include an expectation of a squared deviation of a random variable from a population mean or a sample mean.

As further shown in FIG. 1E, and by reference number 165, the monitoring system 120 may determine whether the variance satisfies a variance threshold. For example, the monitoring system 120 may determine the variance threshold (e.g., that provides an indication of a catastrophic event, such as a natural disaster), and may determine whether the variance satisfies the variance threshold. In some implementations, the monitoring system 120 may determine that the variance satisfies the variance threshold. Alternatively, the monitoring system 120 may determine that the variance fails to satisfy the variance threshold.

Figure 1F:
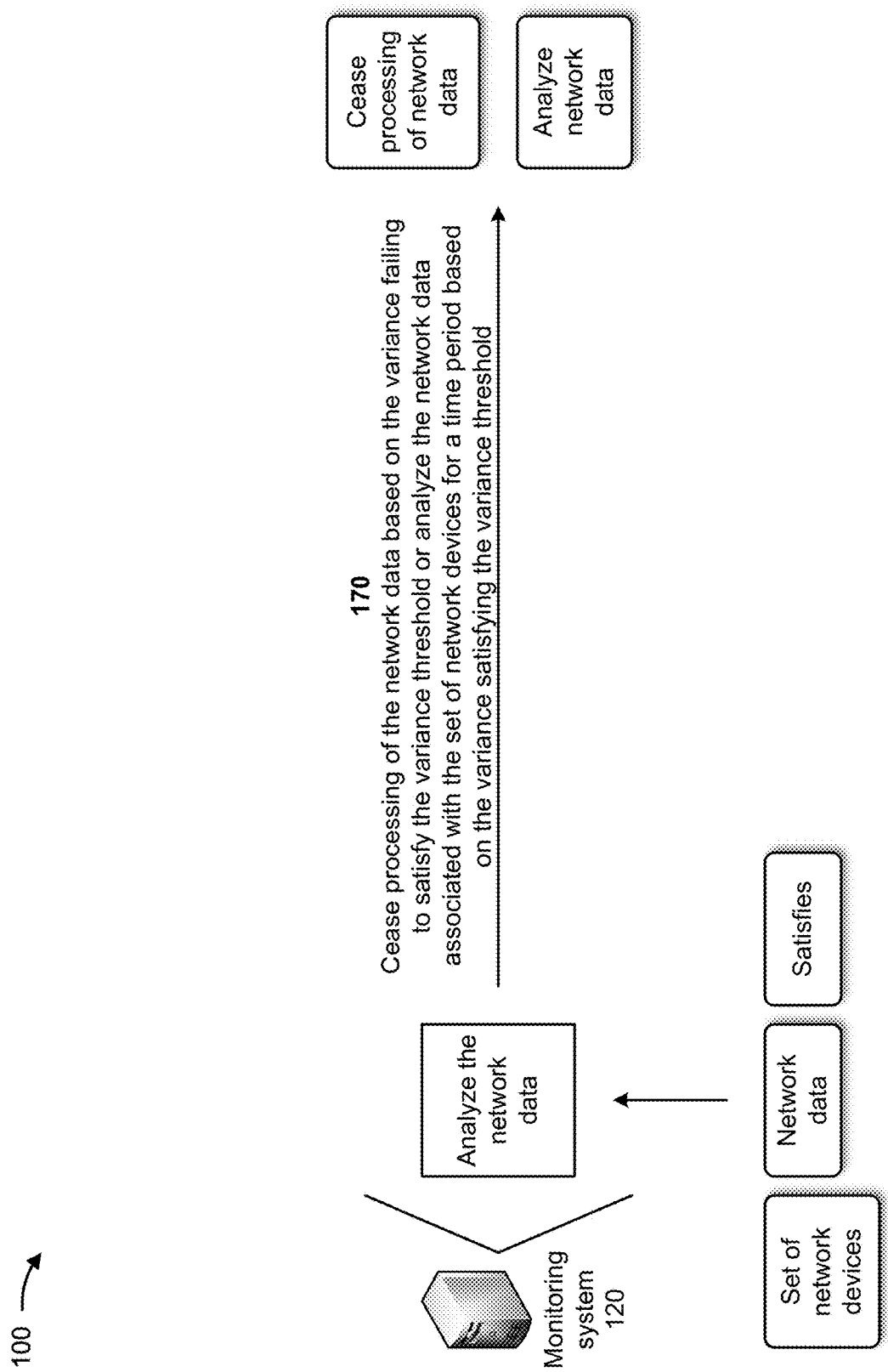

As shown in FIG. 1F, and by reference number 170, the monitoring system 120 may cease processing of the network data based on the variance failing to satisfy the variance threshold or may analyze the network data associated with the set of network devices, for a time period, based on the variance satisfying the variance threshold. For example, if the monitoring system 120 determines that the variance fails to satisfy the variance threshold, the monitoring system 120 may cease processing the network data and may identify one or more network events (e.g., natural disasters, power outages, and/or the like). The monitoring system 120 may cease processing the network data since monitoring for unbalanced traffic in the network devices may be futile during the one or more network events (e.g., due to traffic surges during such events). In this way, the monitoring system 120 may conserve resources associated with unnecessary monitoring.

Alternatively, if the monitoring system 120 determines that the variance satisfies the variance threshold, the monitoring system 120 may analyze the network data associated with the set of network devices for a time period (e.g., days, weeks, and/or the like). For example, once all of the above-described checkpoints are satisfied (e.g., including satisfaction of the variance threshold), the monitoring system 120 may determine that monitoring for unbalanced traffic in the network devices is useful since the network data is not associated with system anomalies, network anomalies, event anomalies, and/or the like. Rather, any anomalies in the network data may be associated with unbalanced traffic in the network devices. Thus, the monitoring system 120 may analyze the network data associated with the set of network devices for the time period, to determine whether there is a rapid increase in traffic (e.g., greater than a traffic rate threshold) for a particular network device (e.g., a particular P-CSCF or a particular SMF), a gradual increase in traffic (e.g., less than a traffic rate threshold) for the particular network device, and/or the like.

Figure 1G:
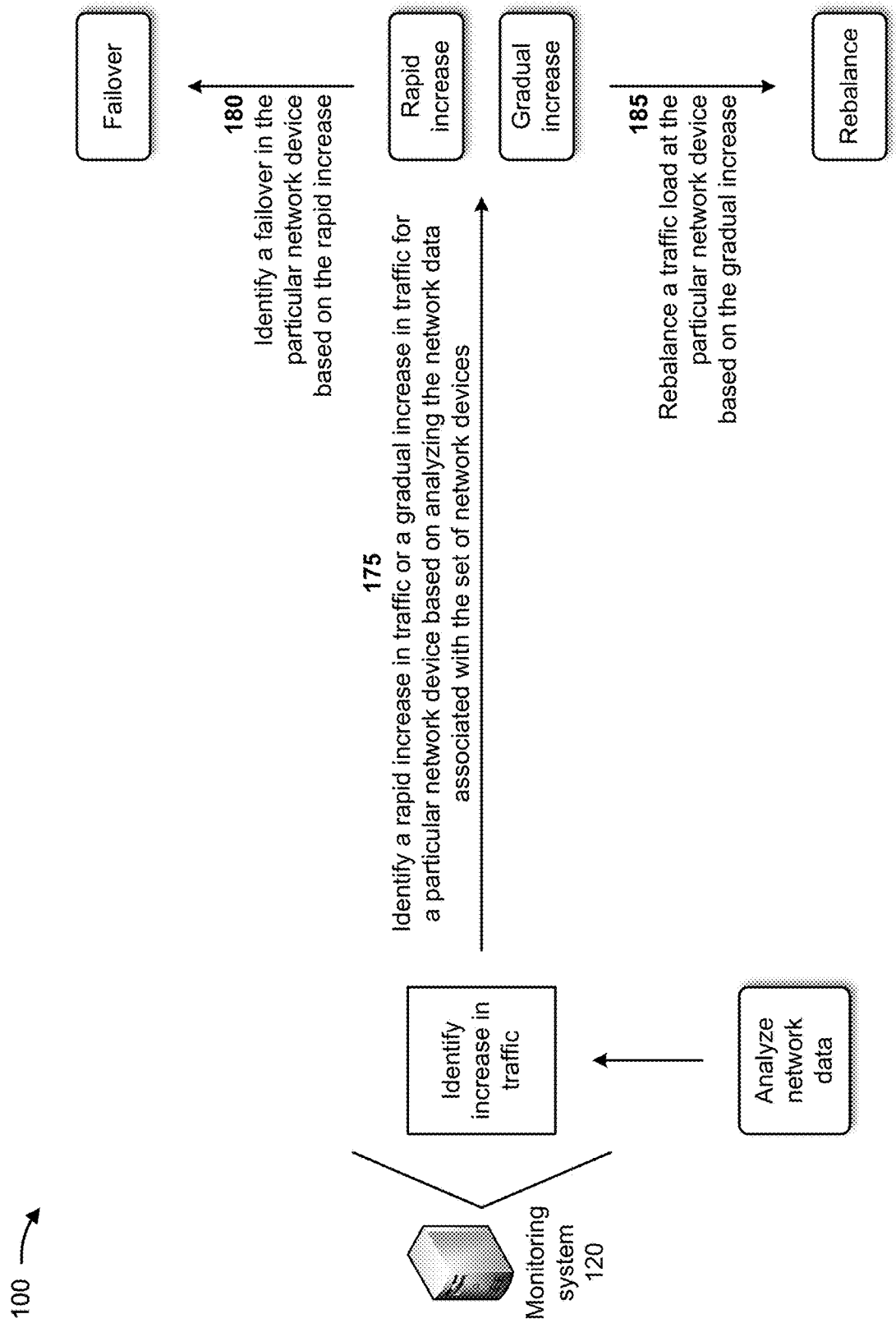

As shown in FIG. 1G, and by reference number 175, the monitoring system 120 may identify a rapid increase in traffic or a gradual increase in traffic for a particular network device based on analyzing the network data associated with the set of network devices. For example, the monitoring system 120 may analyze the network data associated with the set of network devices for the time period to determine whether there is a rapid increase in traffic (e.g., greater than a traffic rate threshold) for a particular network device (e.g., a particular P-CSCF or a particular SMF) or a gradual increase in traffic (e.g., less than a traffic rate threshold) for the particular network device.

As further shown in FIG. 1G, and by reference number 180, the monitoring system 120 may identify a failover in the particular network device based on the rapid increase. For example, if the monitoring system 120 determines that there is a rapid increase in traffic (e.g., greater than a traffic rate threshold) for the particular network device, the monitoring system 120 may identify a failover in the particular network device based on determining the rapid increase in the traffic for the particular network device.

As further shown in FIG. 1G, and by reference number 185, the monitoring system 120 may rebalance a traffic load at the particular network device based on the gradual increase. For example, if the monitoring system 120 determines that there is a gradual increase in traffic (e.g., less than a traffic rate threshold) for the particular network device, the monitoring system 120 may rebalance the traffic load at the particular network device based on determining the gradual increase in the traffic for the particular network device. Alternatively, the monitoring system 120 may cause the particular network device to cease responding to health checks based on determining the gradual increase in the traffic for the particular network device. Alternatively, the monitoring system 120 may cause the particular network device to continuously determine a traffic load of the particular network device based on determining the gradual increase in the traffic for the particular network device.

In this way, the monitoring system 120 monitors network devices associated with an IMS network based on predictive analysis. For example, the monitoring system 120 may proactively monitor an IMS network and network devices (e.g., the P-CSCF and/or the SMF) associated with the IMS network, and may proactively rebalance traffic at the P-CSCF and/or the SMF based on predictive analysis, network KPIs, and system data. The monitoring system 120 may perform an analysis of historical data associated with the IMS network, and may utilize existing behavior patterns of the IMS network to predict future events in the IMS network (e.g., which may cause unbalanced traffic at the P-CSCF and/or the SMF and network disruption). Thus, the monitoring system 120 may conserve computing resources, networking resources, and/or other resources that would otherwise have been consumed by reactively monitoring a network, rebalancing traffic at the P-CSCF and/or the SMF after observing network issues, causing a network disruption and lost traffic, attempting to recover the lost traffic caused by the network disruption, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
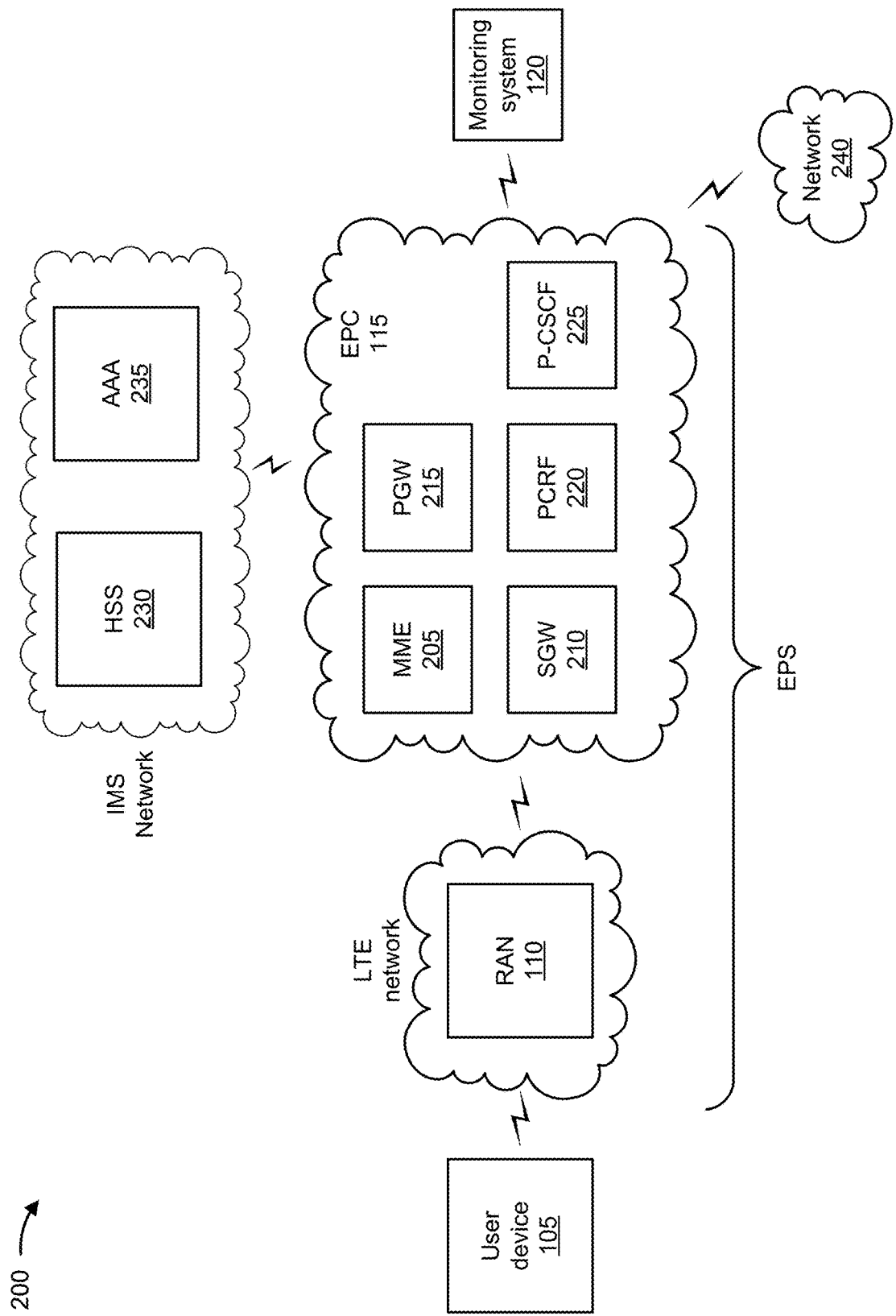
FIGS. 2 and 3 are diagrams of example environments in which systems and/or methods described herein may be implemented.

FIG. 2 is a diagram of an example environment 200 in which systems and/or methods, described herein, may be implemented. As shown in FIG. 2, the environment 200 may include the user device 105, the RAN 110, the core network 115 (e.g., an evolved packet core (EPC) 115), and the monitoring system 120. The core network 115 may include a mobility management entity device (MME) 205, a secure gateway (SGW) 210, a packet data network gateway (PGW) 215, a policy and charging rules function (PCRF) 220, the IMS network, a HSS 230, an AAA 235, and a network 240. Devices of the environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

The monitoring system 120 may include one or more devices capable of receiving, generating, storing, processing, providing, and/or routing information, as described elsewhere herein. The monitoring system 120 may include a communication device and/or a computing device. For example, the monitoring system 120 may include a server, such as an application server, a client server, a web server, a database server, a host server, a proxy server, a virtual server (e.g., executing on computing hardware), or a server in a cloud computing system. In some implementations, the monitoring system 120 may include computing hardware used in a cloud computing environment.

Some implementations are described herein as being performed within a long-term evolution (LTE) network for explanatory purposes. Some implementations may be performed within a network that is not an LTE network, such as a third generation (3G) network or a 5G network.

The environment 200 may include an evolved packet system (EPS) that includes an LTE network and/or the EPC 115 (e.g., the core network 115) that operate based on a third-generation partnership project (3GPP) wireless communication standard. The LTE network may include a RAN that includes one or more RANs 110 that take the form of evolved Node Bs (eNBs) via which the user device 105 communicates with the EPC 115. The EPC 115 may include the MME 205, the SGW 210, the PGW 215, and the PCRF 220 to enable the user device 105 to communicate with the network 240 and/or the IMS network. The IMS network may include the HSS 230 and/or the AAA 235, and may manage device registration and authentication, session initiation, and/or other operations associated with user devices 105. The HSS 230 and/or the AAA 235 may reside in the EPC 115 and/or the IMS network.

The MME 205 includes one or more devices, such as one or more server devices, capable of managing authentication, activation, deactivation, and/or mobility functions associated with the user device 105. In some implementations, the MME 205 may perform operations relating to authentication of the user device 105. Additionally, or alternatively, the MME 205 may facilitate the selection of a particular SGW 210 and/or a particular PGW 215 to provide traffic to and/or from the user device 105. The MME 205 may perform operations associated with handing off the user device 105 from a first RAN 110 to a second RAN 110 when the user device 105 is transitioning from a first cell associated with the first RAN 110 to a second cell associated with the second RAN 110. Additionally, or alternatively, the MME 205 may select another MME (not pictured), to which the user device 105 should be handed off (e.g., when the user device 105 moves out of range of the MME 205).

The SGW 210 includes one or more devices capable of routing packets. For example, the SGW 210 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, the SGW 210 may aggregate traffic received from one or more RANs 110 associated with the LTE network, and may send the aggregated traffic to the network 240 (e.g., via the PGW 215) and/or other network devices associated with the EPC 115 and/or the IMS network. The SGW 210 may receive traffic from the network 240 and/or other network devices, and may send the received traffic to the user device 105 via the RAN 110. Additionally, or alternatively, the SGW 210 may perform operations associated with handing off the user device 105 to and/or from an LTE network.

The PGW 215 includes one or more devices capable of providing connectivity for the user device 105 to external packet data networks (e.g., other than the depicted EPC 115 and/or the LTE network). For example, the PGW 215 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, the PGW 215 may aggregate traffic received from one or more SGWs 210, and may send the aggregated traffic to the network 240. Additionally, or alternatively, the PGW 215 may receive traffic from the network 240, and may send the traffic to the user device 105 via the SGW 210 and the RAN 110. The PGW 215 may record data usage information (e.g., byte usage), and may provide the data usage information to the AAA 235.

The PCRF 220 includes one or more devices, such as one or more server devices, capable of providing policy control decision and flow-based charging control functionalities. For example, the PCRF 220 may provide network control regarding service data flow detection, gating, and/or quality of service (QoS) and flow-based charging, among other examples. In some implementations, the PCRF 220 may determine how a certain service data flow is to be treated, and may ensure that user plane traffic mapping and treatment is in accordance with a user subscription profile.

The HSS 230 includes one or more devices, such as one or more server devices, capable of managing (e.g., receiving, generating, storing, processing, and/or providing) information associated with the user device 105. For example, the HSS 230 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 230 may provide this information to one or more other devices of the environment 200 to support the operations performed by those devices.

The AAA 235 includes one or more devices, such as one or more server devices, that perform authentication, authorization, and/or accounting operations for communication sessions associated with the user device 105. For example, the AAA 235 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 240 includes one or more wired and/or wireless networks. For example, the network 240 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 3 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
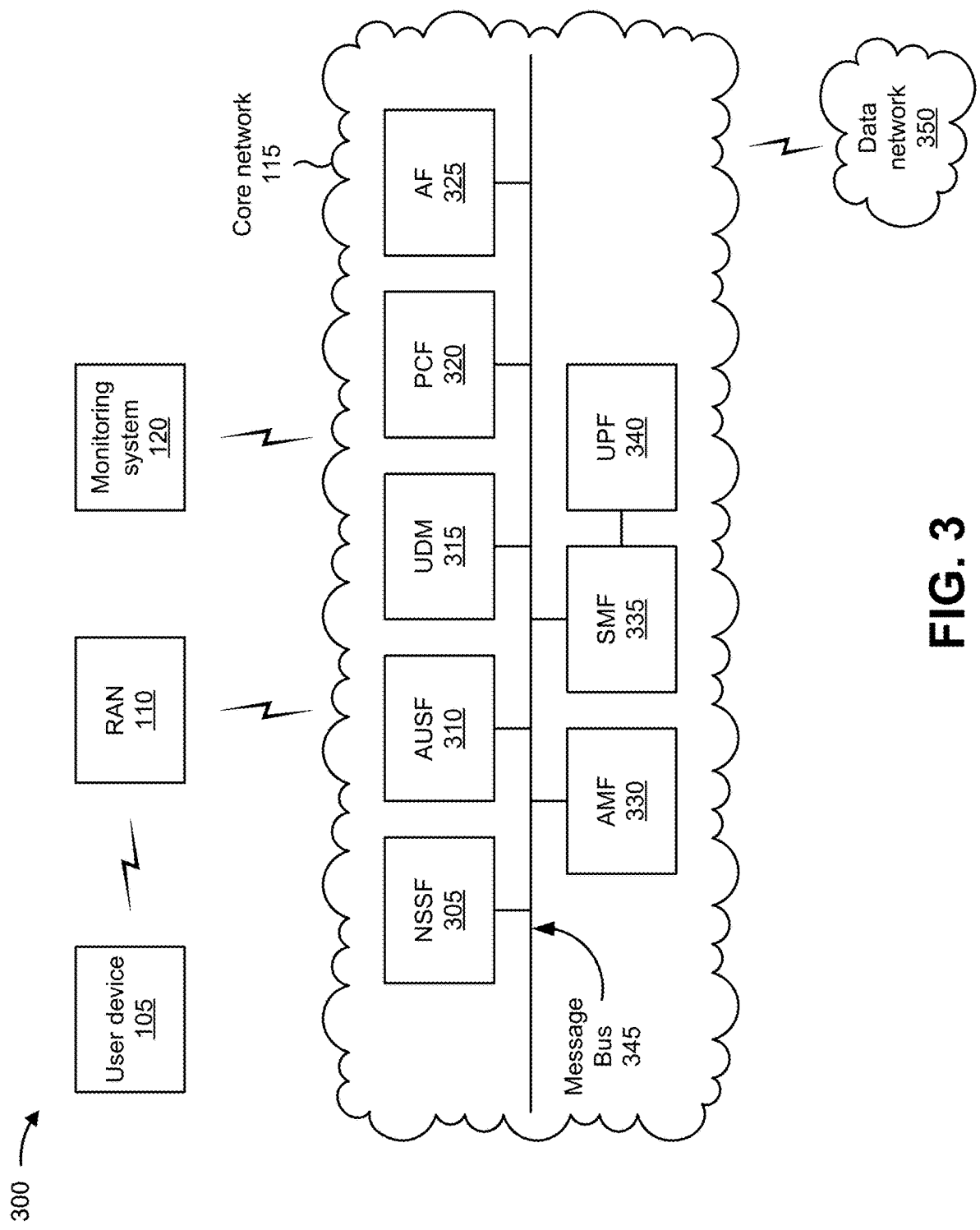

FIG. 3 is a diagram of an example environment 300 in which systems and/or methods described herein may be implemented. As shown in FIG. 3, the example environment 300 may include the user device 105, the RAN 110, the core network 115, the monitoring system 120, and a data network 350. Details of the user device 105, the RAN 110, and the monitoring system 120 are provided elsewhere herein. Devices and/or networks of the example environment 300 may interconnect via wired connections, wireless connections, or a combination of wired and wireless connections.

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 3 may be an example of a service-based architecture, in some implementations, the core network 115 may be implemented as a reference-point architecture and/or a 4G core network, among other examples.

As shown in FIG. 3, the core network 115 may include a number of functional elements. The functional elements may include, for example, a network slice selection function (NSSF) 305, an authentication server function (AUSF) 310, a unified data management (UDM) component 315, a policy control function (PCF) 320, an application function (AF) 325, an access and mobility management function (AMF) 330, a session management function (SMF) 335, and/or a user plane function (UPF) 340. The functional elements may be communicatively connected via a message bus 345. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 305 includes one or more devices that select network slice instances for the user device 105. By providing network slicing, the NSSF 305 allows an operator to deploy multiple substantially independent end-to-end networks potentially with the same infrastructure. In some implementations, each slice may be customized for different services.

The AUSF 310 includes one or more devices that act as an authentication server and support the process of authenticating the user device 105 in the wireless telecommunications system.

The UDM 315 includes one or more devices that store user data and profiles in the wireless telecommunications system. The UDM 315 may be used for fixed access and/or mobile access in the core network 115.

The PCF 320 includes one or more devices that provide a policy framework that incorporates network slicing, roaming, packet processing, and/or mobility management, among other examples.

The AF 325 includes one or more devices that support application influence on traffic routing, access to a network exposure function (NEF), and/or policy control, among other examples.

The AMF 330 includes one or more devices that act as a termination point for non-access stratum (NAS) signaling and/or mobility management, among other examples.

The SMF 335 includes one or more devices that support the establishment, modification, and release of communication sessions in the wireless telecommunications system. For example, the SMF 335 may configure traffic steering policies at the UPF 340 and/or may enforce user equipment IP address allocation and policies, among other examples.

The UPF 340 includes one or more devices that serve as an anchor point for intraRAT and/or interRAT mobility. The UPF 340 may apply rules to packets, such as rules pertaining to packet routing, traffic reporting, and/or handling user plane QoS, among other examples.

The message bus 345 represents a communication structure for communication among the functional elements. In other words, the message bus 345 may permit communication between two or more functional elements.

The data network 350 includes one or more wired and/or wireless data networks. For example, the data network 350 may include an IMS, a PLMN, a LAN, a WAN, a MAN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example environment 300 may perform one or more functions described as being performed by another set of devices of the example environment 300.

Figure 4:
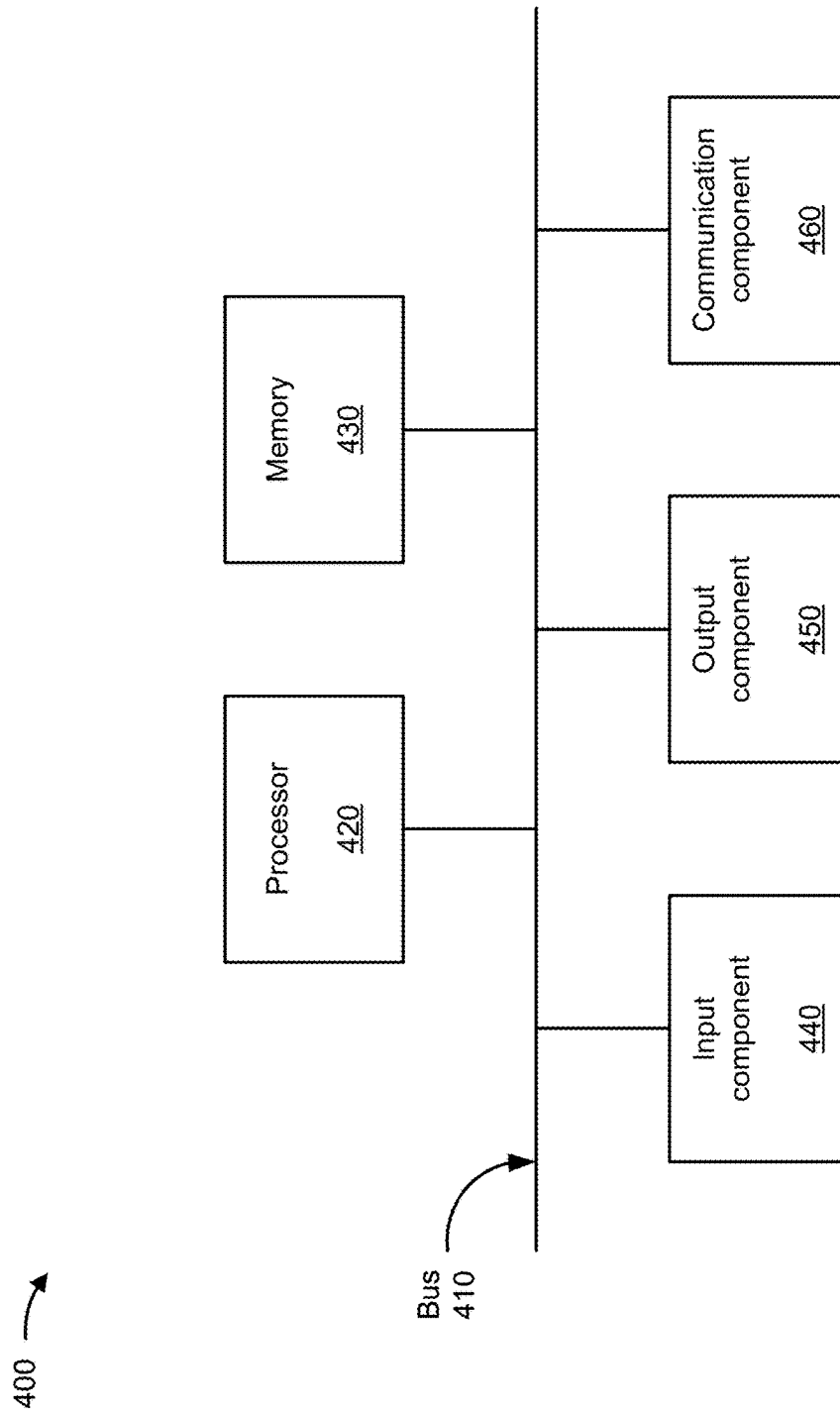
FIG. 4 is a diagram of example components of one or more devices of FIGS. 2 and 3.

FIG. 4 is a diagram of example components of a device 400, which may correspond to the user device 105, the RAN 110, the monitoring system 120, the MME 205, the SGW 210, the PGW 215, the PCRF 220, the P-CSCF 225, the HSS 230, the AAA 235, the NSSF 305, the AUSF 310, the UDM 315, the PCF 320, the AF 325, the AMF 330, the SMF 335, and/or the UPF 340. In some implementations, the user device 105, the RAN 110, the monitoring system 120, the MME 205, the SGW 210, the PGW 215, the PCRF 220, the P-CSCF 225, the HSS 230, the AAA 235, the NSSF 305, the AUSF 310, the UDM 315, the PCF 320, the AF 325, the AMF 330, the SMF 335, and/or the UPF 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
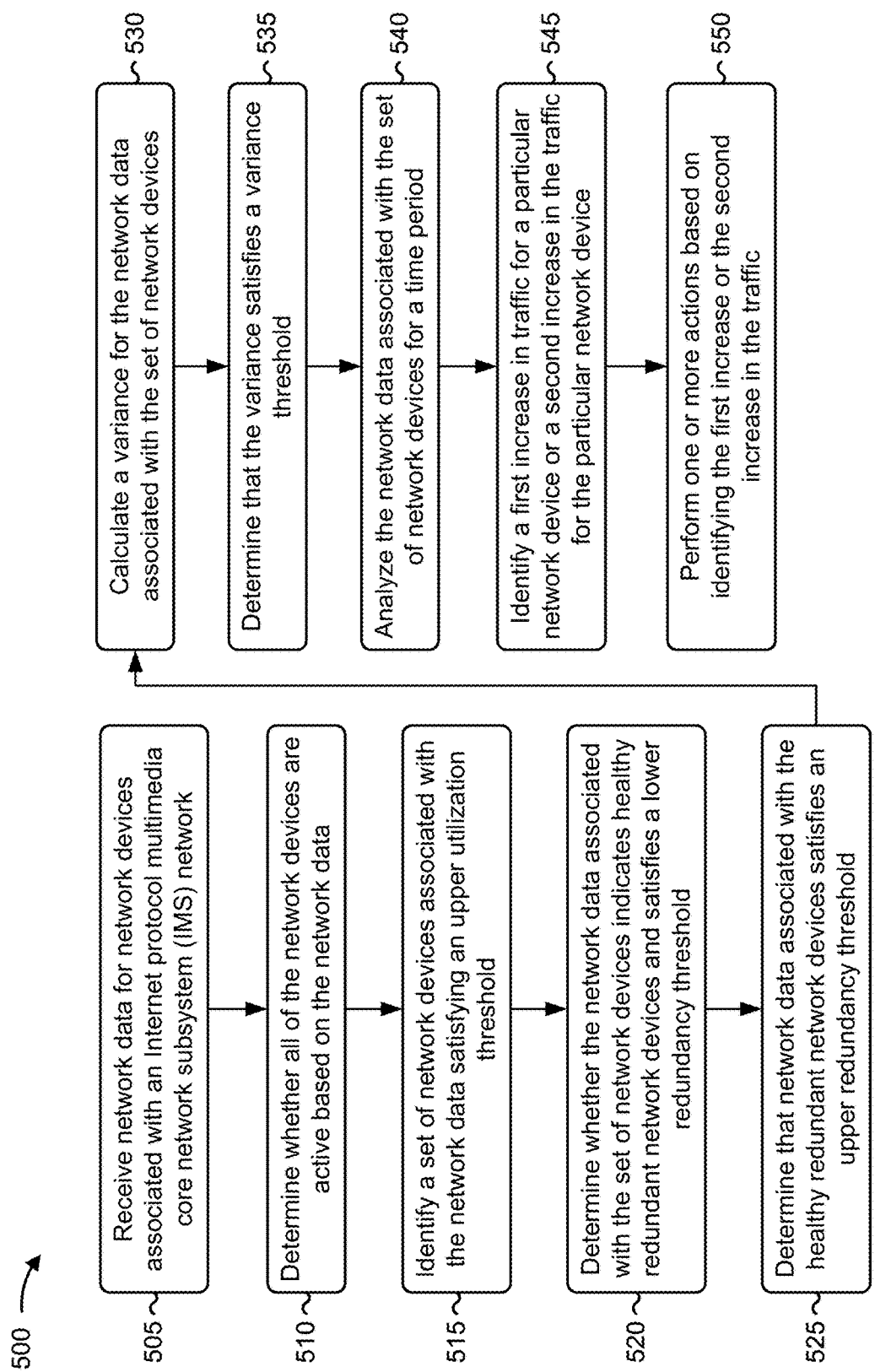
FIG. 5 is a flowchart of an example process for monitoring network devices associated with an IMS network based on predictive analysis.

FIG. 5 is a flowchart of an example process 500 for monitoring network devices associated with an IMS network based on predictive analysis. In some implementations, one or more process blocks of FIG. 5 may be performed by a device (e.g., the monitoring system 120). In some implementations, one or more process blocks of FIG. 5 may be performed by another device or a group of devices separate from or including the device, such as a P-CSCF (e.g., the P-CSCF 230) and/or an SMF (e.g., the SMF 335). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving network data for network devices associated with an IMS network (block 505). For example, the device may receive network data for network devices associated with an IMS network, as described above. In some implementations, the network devices are proxy-call session control functions or session management functions. In some implementations, the network data includes data identifying utilizations by the network devices, memory utilizations by the network devices, registering subscribers associated with the network devices, health statuses associated with the network devices, or global traffic management table data associated with the network devices. In some implementations, the network data includes key performance indicators associated with the network devices.

As further shown in FIG. 5, process 500 may include determining whether all of the network devices are active based on the network data (block 510). For example, the device may determine whether all of the network devices are active based on the network data, as described above.

As further shown in FIG. 5, process 500 may include identifying a set of network devices associated with the network data satisfying an upper utilization threshold (block 515). For example, the device may identify a set of network devices, of the network devices, associated with the network data satisfying an upper utilization threshold based on all of the network devices being active, as described above.

As further shown in FIG. 5, process 500 may include determining whether the network data associated with the set of network devices indicates healthy redundant network devices and satisfies a lower redundancy threshold (block 520). For example, the device may determine whether the network data associated with the set of network devices indicates healthy redundant network devices for the set of network devices and satisfies a lower redundancy threshold, as described above.

As further shown in FIG. 5, process 500 may include determining that network data associated with the healthy redundant network devices satisfies an upper redundancy threshold (block 525). For example, the device may determine that network data associated with the healthy redundant network devices for the set of network devices satisfies an upper redundancy threshold, as described above.

As further shown in FIG. 5, process 500 may include calculating a variance for the network data associated with the set of network devices (block 530). For example, the device may calculate a variance for the network data associated with the set of network devices based on the network data associated with the healthy redundant network devices satisfying the upper redundancy threshold, as described above.

As further shown in FIG. 5, process 500 may include determining that the variance satisfies a variance threshold (block 535). For example, the device may determine that the variance satisfies a variance threshold, as described above.

As further shown in FIG. 5, process 500 may include analyzing the network data associated with the set of network devices for a time period (block 540). For example, the device may analyze the network data associated with the set of network devices, for a time period, based on the variance satisfying the variance threshold, as described above.

As further shown in FIG. 5, process 500 may include identifying a first increase in traffic for a particular network device or a second increase in the traffic for the particular network device (block 545). For example, the device may identify a first increase in traffic for a particular network device, of the set of network devices, or a second increase in the traffic for the particular network device based on analyzing the network data associated with the set of network devices, as described above.

As further shown in FIG. 5, process 500 may include performing one or more actions based on identifying the first increase or the second increase in the traffic (block 550). For example, the device may perform one or more actions based on identifying the first increase or the second increase in the traffic for the particular network device, as described above. In some implementations, performing the one or more actions includes identifying a failover in the particular network device based on identifying the first increase in the traffic for the particular network device, or rebalancing a traffic load at the particular network device based on identifying the second increase in the traffic for the particular network device. In some implementations, performing the one or more actions includes causing the particular network device to cease responding to health checks based on identifying the second increase in the traffic for the particular network device, or causing the particular network device to continuously determine a traffic load of the particular network device based on identifying the second increase in the traffic for the particular network device.

In some implementations, process 500 includes ceasing processing of the network data based on less than all of the network devices being active. In some implementations, process 500 includes ceasing processing of the network data based on the network data associated with the set of network devices indicating unhealthy redundant network devices for the set of network devices or failing to satisfy the lower redundancy threshold.

In some implementations, process 500 includes ceasing processing of the network data based on the network data associated with the healthy redundant network devices for the set of network devices failing to satisfy the upper redundancy threshold. In some implementations, process 500 includes ceasing processing of the network data based on the variance failing to satisfy the variance threshold.

In some implementations, process 500 includes identifying unhealthy redundant network devices for the set of network devices based on the network data associated with the set of network devices indicating the unhealthy redundant network devices or failing to satisfy the lower redundancy threshold. In some implementations, process 500 includes identifying failures associated with neighboring network devices of the set of network devices based on the network data associated with the healthy redundant network devices for the set of network devices failing to satisfy the upper redundancy threshold. In some implementations, process 500 includes identifying one or more network events based on the variance failing to satisfy the variance threshold.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
 receiving, by a device, network data for network devices associated with an Internet protocol multimedia core network subsystem (IMS) network;
 determining, by the device, whether all of the network devices are active based on the network data;
 identifying, by the device, a set of network devices, of the network devices, associated with the network data satisfying an upper utilization threshold based on all of the network devices being active;
 determining, by the device, whether the network data associated with the set of network devices indicates healthy redundant network devices for the set of network devices and satisfies a lower redundancy threshold;
 determining, by the device and based on determining that the network data associated with the set of network devices satisfies the lower redundancy threshold, that network data associated with the healthy redundant network devices for the set of network devices satisfies an upper redundancy threshold;
 calculating, by the device, a variance for the network data associated with the set of network devices based on the network data associated with the healthy redundant network devices satisfying the upper redundancy threshold;
 determining, by the device, that the variance satisfies a variance threshold;
 analyzing, by the device, the network data associated with the set of network devices, for a time period, based on the variance satisfying the variance threshold;
 identifying, by the device, a first increase in traffic for a particular network device, of the set of network devices, or a second increase in the traffic for the particular network device based on analyzing the network data associated with the set of network devices; and
 performing, by the device, one or more actions based on identifying the first increase or the second increase in the traffic for the particular network device.

2. The method of claim 1, wherein performing the one or more actions comprises one or more of:
 identifying a failover in the particular network device based on identifying the first increase in the traffic for the particular network device; or
 rebalancing a traffic load at the particular network device based on identifying the second increase in the traffic for the particular network device.

3. The method of claim 1, wherein performing the one or more actions comprises one or more of:
 causing the particular network device to cease responding to health checks based on identifying the second increase in the traffic for the particular network device; or
 causing the particular network device to continuously determine a traffic load of the particular network device based on identifying the second increase in the traffic for the particular network device.

4. The method of claim 1, further comprising:
 ceasing processing of the network data based on less than all of the network devices being active.

5. The method of claim 1, further comprising:
 ceasing processing of the network data based on the network data associated with the set of network devices indicating unhealthy redundant network devices for the set of network devices or failing to satisfy the lower redundancy threshold.

6. The method of claim 1, further comprising:
 ceasing processing of the network data based on the network data associated with the healthy redundant network devices for the set of network devices failing to satisfy the upper redundancy threshold.

7. The method of claim 1, further comprising:
 ceasing processing of the network data based on the variance failing to satisfy the variance threshold.

8. A device, comprising:
 one or more processors configured to:
  receive network data for network devices associated with an Internet protocol multimedia core network subsystem (IMS) network;
  determine whether all of the network devices are active based on the network data;
  cease processing of the network data based on less than all of the network devices being active;
  identify a set of network devices, of the network devices, associated with the network data satisfying an upper utilization threshold based on all of the network devices being active;
  determine whether the network data associated with the set of network devices indicates healthy redundant network devices for the set of network devices and satisfies a lower redundancy threshold;
  determine, based on determining that the network data associated with the set of network devices satisfies the lower redundancy threshold, that network data associated with the healthy redundant network devices for the set of network devices satisfies an upper redundancy threshold;
  calculate a variance for the network data associated with the set of network devices based on the network data associated with the healthy redundant network devices satisfying the upper redundancy threshold;
  determine that the variance satisfies a variance threshold;
  analyze the network data associated with the set of network devices, for a time period, based on the variance satisfying the variance threshold;
  identify a first increase in traffic for a particular network device, of the set of network devices, or a second increase in the traffic for the particular network device based on analyzing the network data associated with the set of network devices; and
  perform one or more actions based on identifying the first increase or the second increase in the traffic for the particular network device.

9. The device of claim 8, wherein the network devices are proxy-call session control functions or session management functions.

10. The device of claim 8, wherein the network data includes data identifying one or more of:
 processor utilizations by the network devices,
 memory utilizations by the network devices, registered subscribers associated with the network devices,
health statuses associated with the network devices, or
global traffic management table data associated with the network devices.

11. The device of claim 8, wherein the one or more processors are further configured to:
identify unhealthy redundant network devices for the set of network devices based on the network data associated with the set of network devices indicating the unhealthy redundant network devices or failing to satisfy the lower redundancy threshold.

12. The device of claim 8, wherein the one or more processors are further configured to:
identify failures associated with neighboring network devices of the set of network devices based on the network data associated with the healthy redundant network devices for the set of network devices failing to satisfy the upper redundancy threshold.

13. The device of claim 8, wherein the one or more processors are further configured to:
identify one or more network events based on the variance failing to satisfy the variance threshold.

14. The device of claim 8, wherein the network data includes key performance indicators associated with the network devices.

15. A non-transitory computer-readable medium storing a set of instructions, the set of instructions comprising:
one or more instructions that, when executed by one or more processors of a device, cause the device to:
receive network data for network devices associated with an Internet protocol multimedia core network subsystem (IMS) network;
determine whether all of the network devices are active based on the network data;
identify a set of network devices, of the network devices, associated with the network data satisfying an upper utilization threshold based on all of the network devices being active;
determine whether the network data associated with the set of network devices indicates healthy redundant network devices for the set of network devices and satisfies a lower redundancy threshold;
determine, based on determining that the network data associated with the set of network devices satisfies the lower redundancy threshold, that network data associated with the healthy redundant network devices for the set of network devices satisfies an upper redundancy threshold;
calculate a variance for the network data associated with the set of network devices based on the network data associated with the healthy redundant network devices satisfying the upper redundancy threshold;
determine that the variance satisfies a variance threshold;
analyze the network data associated with the set of network devices, for a time period, based on the variance satisfying the variance threshold;
identify a first increase in traffic for a particular network device, of the set of network devices, or a second increase in the traffic for the particular network device based on analyzing the network data associated with the set of network devices; and
identify a failover in the particular network device based on identifying the first increase in the traffic for the particular network device.

16. The non-transitory computer-readable medium of claim 15, wherein the one or more instructions further cause the device to:
rebalance a traffic load at the particular network device based on identifying the second increase in the traffic for the particular network device.

17. The non-transitory computer-readable medium of claim 15, wherein the one or more instructions further cause the device to one or more of:
cause the particular network device to cease responding to health checks based on identifying the second increase in the traffic for the particular network device; or
cause the particular network device to continuously determine a traffic load of the particular network device based on identifying the second increase in the traffic for the particular network device.

18. The non-transitory computer-readable medium of claim 15, wherein the one or more instructions further cause the device to one or more of:
cease processing of the network data based on the network data associated with the set of network devices indicating unhealthy redundant network devices for the set of network devices or failing to satisfy the lower redundancy threshold;
cease processing of the network data based on the network data associated with the healthy redundant network devices for the set of network devices failing to satisfy the upper redundancy threshold; or
cease processing of the network data based on the variance failing to satisfy the variance threshold.

19. The non-transitory computer-readable medium of claim 15, wherein the one or more instructions further cause the device to:
identify unhealthy redundant network devices for the set of network devices based on the network data associated with the set of network devices indicating the unhealthy redundant network devices or failing to satisfy the lower redundancy threshold.

20. The non-transitory computer-readable medium of claim 15, wherein the one or more instructions further cause the device to:
identify failures associated with neighboring network devices of the set of network devices based on the network data associated with the healthy redundant network devices for the set of network devices failing to satisfy the upper redundancy threshold.

* * * * *